United States Patent

Chess

Patent Number: 5,253,803
Date of Patent: Oct. 19, 1993

[54] REUSABLE MAILER

[75] Inventor: Stanley C. Chess, Jerome, Id.

[73] Assignee: Moore Business Forms, Inc., Grand Island, N.Y.

[21] Appl. No.: 936,394

[22] Filed: Aug. 31, 1992

[51] Int. Cl.$^5$ .............................................. B65D 27/06
[52] U.S. Cl. ................................... 229/305; 229/306; 229/314
[58] Field of Search ............... 229/300, 301, 305, 306, 229/313, 314

[56] References Cited

U.S. PATENT DOCUMENTS

| | | | |
|---|---|---|---|
| 4,770,337 | 9/1988 | Leibe | 229/69 |
| 4,815,654 | 3/1989 | Buescher | 229/306 X |
| 4,830,269 | 5/1989 | Jenkins | 229/305 X |
| 4,984,733 | 1/1991 | Dunn, Jr. | |
| 5,011,069 | 4/1991 | Bowen et al. | 229/69 |
| 5,110,043 | 5/1992 | Ashby | 229/304 |
| 5,169,061 | 12/1992 | Buescher | 229/305 |

Primary Examiner—Allan N. Shoap
Assistant Examiner—Jes F. Pascua
Attorney, Agent, or Firm—Nixon & Vanderhye

[57] ABSTRACT

A return mailer is provided in which the outgoing and reply addresses cannot be confused, and the mailer can be changed over from an outgoing mailer to a reply mailer with a minimum of effort. The mailer includes a number of plies including a first ply having an outgoing address visible on it, at least one insert ply, a second ply, and a third ply. A sealing agent, such as tape covered by a release sheet or rewettable glue, is associated with one of the plies for sealing the plies of a reply configuration together. The second ply has a reply address printed on its outer, second face, and a portion of it is pivotally mounted to fold over the first ply. The reply configuration of the mailer includes the first, second, and third plies disposed with respect to each other so that the third ply is pivoted about its pivot portion to a position where the second face of the third ply is readily visible, and the outgoing address is no longer visible, the third ply cooperating with the sealing agent to form a reply envelope.

5 Claims, 3 Drawing Sheets

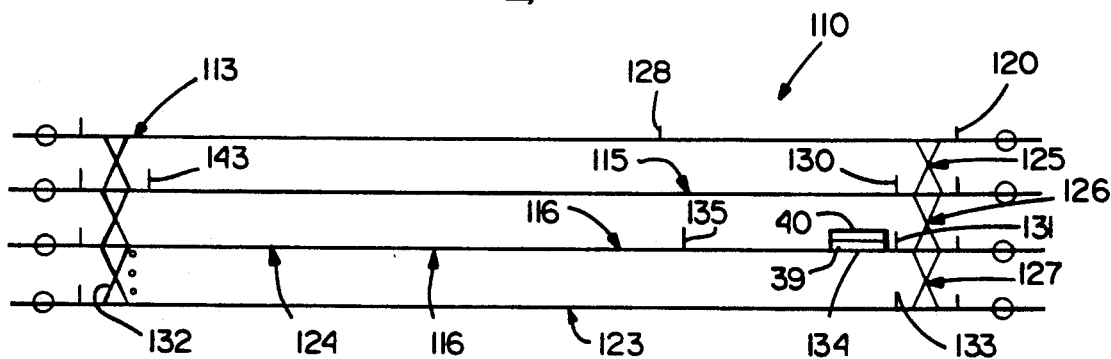
Fig. 4
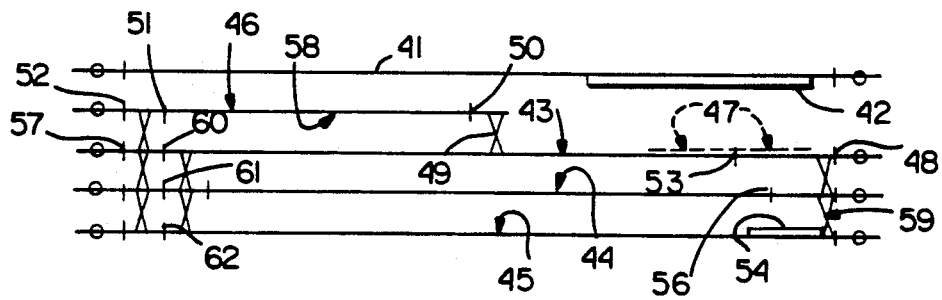
Fig. 5
Fig. 6
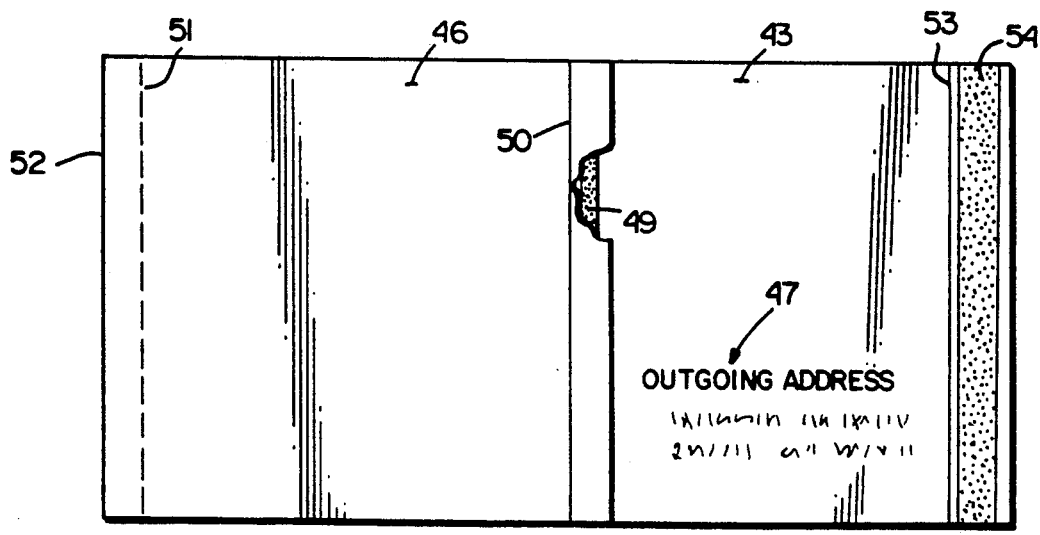

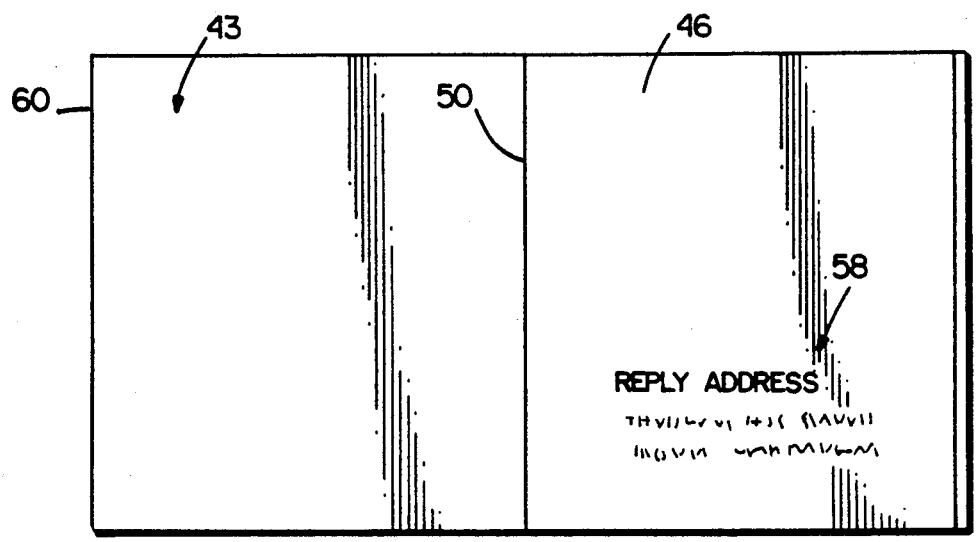
Fig. 7
Fig. 8
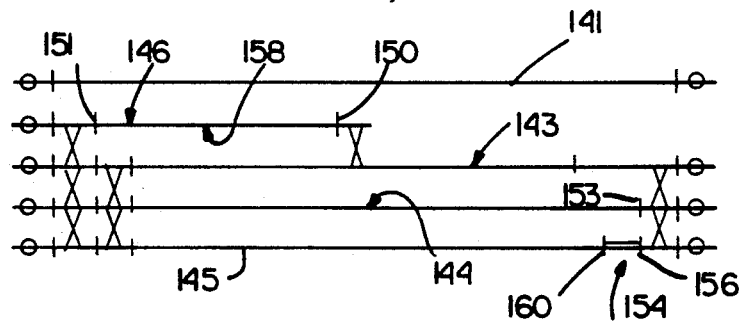
Fig. 9
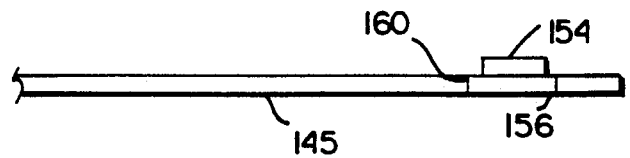

REUSABLE MAILER

BACKGROUND AND SUMMARY OF THE INVENTION

It is desirable to provide in business forms the same basic envelope construction that can serve both as an outgoing piece and a reply piece. In order to effect this purpose, sometimes mailers have been provided with a reply address which can readily be confused with the outgoing address, resulting in the mailer being mailed to the reply address rather than the outgoing address. Postal regulations carefully control the relative sizes and positions of outgoing and reply addresses, making it difficult to properly design an envelope that can serve as both an outgoing and reply envelope with visible indicia for both purposes. In some mailer constructions, an extra ply of paper has been utilized to form a cover ply which extends over a portion of the front face to cover and underlying reply address, the outgoing address being printed on the cover, and the cover removed to expose the reply address by the outgoing addressee. However such a construction, and like known configurations that attempt to provide a mailer entirely suitable for both outgoing and reply purposes, can be difficult to produce.

According to the present invention, a return mailer is provided which provides a ply with a return address thereon pivotally attached to other portions of the outgoing mailer and movable to a position in which it can be sealed to expose the reply address. This construction is simple and easy to make, complies with United States Postal Service regulations, and is easy to effectively use for a reply by the outgoing addressee.

According to a first aspect of the present invention, a return mailer is provided having different outgoing and reply configurations. The mailer comprises. An outgoing configuration comprising a plurality of plies, including a first ply having outgoing address indicia readily visible thereon, at least one insert ply, a second ply, and a third ply, the third ply having a first face visible in the outgoing configuration, and a second face opposite the first face and not visible in the outgoing configuration. A sealing agent associated with one of the plies of the outgoing configuration for sealing plies of a reply configuration together. The third ply has reply address indicia printed thereon on the second face, the third ply pivotally mounted at a portion thereof to one of the first and second plies. And, a reply configuration including the first, second, and third plies disposed with respect to each other so that the third ply is pivoted about the pivot portion thereof to a position wherein the second face of the third ply is readily visible, and the outgoing address is no longer visible, the third ply cooperating with the sealing agent to form a reply envelope. The sealing agent may comprise tape covered with a release sheet (e.g. transfer tape), or rewettable glue. A fly sheet may initially cover the first ply, having image transfer means for transferring the outgoing address indicia to the first ply when the fly sheet is impacted.

According to one variation, the second ply is sandwiched between the first and third plies in the outgoing configuration. The third ply is pivoted to a face of the second ply opposite the first ply, and the first ply is sandwiched between the third ply reply address portion and the second ply in the reply configuration. While the third ply may be of the same length as the first and second plies, it also may be of a length substantially less than that of the second ply, being connected to the second ply in the outgoing configuration remote from an edge of the second ply by a line of adhesive. The third ply has a perforation adjacent the line of adhesive about which it may be detached so that it can pivot about a line of adhesive (and a score line if desired) adjacent an edge of the second ply.

According to another modification, the third ply may have a length of roughly about half of the first ply and be pivotally connected to the first ply adjacent, but spaced from, the outgoing address. The sealing agent may be on the second ply, and a portion of the first ply is removable to allow the third ply first face to be brought into contact with the sealing agent in the reply configuration. Alternatively the sealing agent is formed on the second ply adjacent an edge remote from the first ply, and is pivotally connected to the second ply so that it may be pivoted to a position in sealing association with the third ply in the reply configuration. In either event the third ply is preferably pivotally connected to the first ply with a line of adhesive and a score line formed in the third ply adjacent the line of adhesive.

According to a second aspect of the present invention, a return mailer is provided comprising: A top ply having first and second side edges, a first perforation adjacent the first side edge, and an intermediate perforation. Outgoing address indicia printed on the top ply between the first perforation and the general area of the intermediate perforation. A second ply having first and second side edges, and a first perforation adjacent the first side edge, and a pivot line between the first perforation and the second edge. The second ply of approximately the same dimensions as the top ply and having first and second faces, the first face closest to the top ply. The second ply having a sealing agent disposed on the first face generally in the vicinity of the first perforation. A reply address printed on the second ply second face between the first perforation and the pivot line. And, a third ply connected adjacent a first and second side edges thereof to the face of the second ply opposite the top ply, and removably covering the reply address.

According to a third aspect of the present invention the return mailer comprises. A top ply having first and second side edges, and a first perforation adjacent the first side edge. Outgoing address indicia printed on the top ply closer to the first side edge than the second side edge. A second ply having first and second side edges, and a first perforation adjacent the first side edge, and approximately the same dimensions as the top ply, the second ply having a sealing agent disposed on the face thereof closest to the top ply, generally in the vicinity of the first perforation. A third ply pivotally connected adjacent to a first side edge thereof to the face of the top ply opposite the second ply, and having a first face closest to the top ply, and a second face opposite the first face. The pivotal connection between the third and top plies is provided by pivotally connecting means for connecting the top and third plies together for pivotal movement along a line between the outgoing address indicia and the top ply second side edge. A reply address indicia printed on the third ply first face. And, a line of adhesive connecting the third ply to the top ply so that second side edges thereof are in substantial alignment, and a perforation formed in the third ply adjacent the line of adhesive and between the line of adhesive and the first side edge of the third ply.

It is the primary object of the present invention to provide a return mailer with preprinted outgoing and reply addresses which complies with USPS regulations, and which is easy to utilize in a reply configuration by the outgoing addressee. This and other objects of the invention will become clear from an inspection of the detailed description of the invention, and from the appended claims.

BRIEF DESCRIPTION OF THE DRAWINGS

FIG. 4 is a view like that of FIG. 1 only showing a full length third ply embodiment;

FIG. 5 is a schematic sectional view of another embodiment of return mailer business form according to the invention in an outgoing configuration;

FIG. 6 is a top plan view of the mailer of FIG. 5 after the edge portions have been removed;

FIG. 7 is a view like that of FIG. 6 only after the third ply has been pivoted over in order to reveal the reply address;

FIG. 8 is a schematic sectional view of still another embodiment of return mailer according to the invention in an outgoing configuration; and FIG. 9 is a detail schematic view illustrating particular sealing agent of the FIGURE 8 embodiment.

DETAILED DESCRIPTION OF THE DRAWINGS

Figure 1:
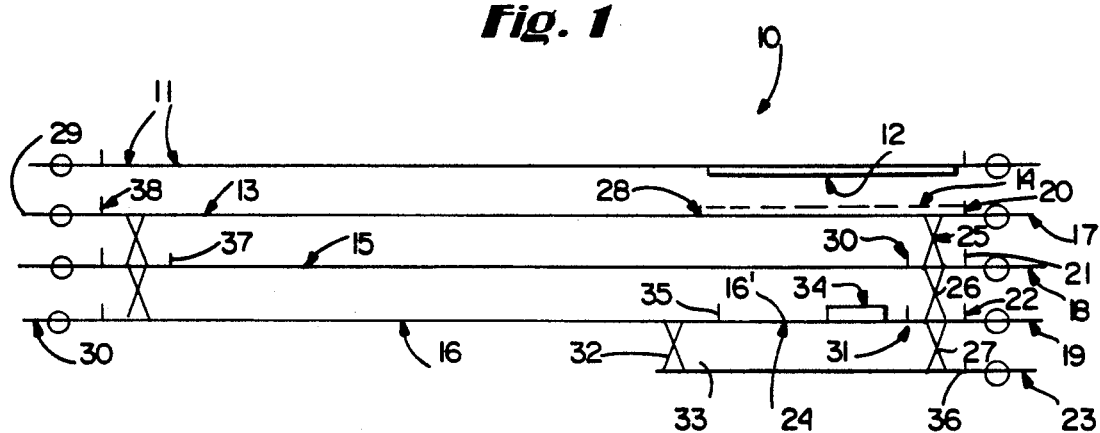
FIG. 1 is a schematic sectional view of a first embodiment of a return mailer business form according to the invention in the outgoing configuration.

An exemplary return mailer according to the present invention is shown generally by reference numeral 10 in FIG. 1. The mailer includes a fly sheet 11 which is removed before it is actually put into the mail, the fly sheet 11 having a carbon spot or like image transfer means 12 associated therewith so that when the fly sheet 11 is impacted on the top thereof by a typewriter, printer, or the like above the carbon spot or like image transfer means 12, the image is transferred onto the first ply 13 of the mailer 10 to provide outgoing address indicia, shown schematically at 14 in FIG. 1.

The mailer 10 further comprises at least one insert ply 15, and a second ply 16, the insert ply being disposed between the first and second plies 13, 16. The plies 13, 16—and in fact one or more insert plies 15—preferably have approximately the same dimensions and are quadrate in configuration. They each have first edges 17, 18, 19 respectively with perforations 20, 21, 22 respectively formed adjacent thereto.

Figure 2:
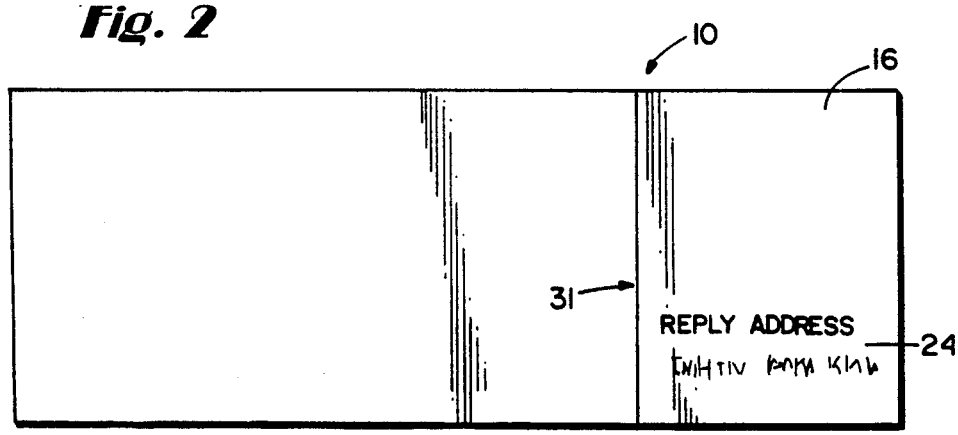
FIG. 2 is a bottom plan view of the form of FIG. 1 in the reply configuration.

The mailer 10 further comprises a third ply 23 that covers the reply address indicia 24 printed on the fold-over portion 16' of the back of ply 16 shown schematically in FIG. 1 and more descriptively in FIG. 2. Paste lines 25, 26, 27 interconnect the plies 13, 15, 16, and 23 together at the right end (as viewed in FIG. 1) thereof.

The first ply 13, which is the top ply in an outgoing configuration, also has a line of weakness (preferably a perforation line) 28 formed at an intermediate portion thereof between the perforation 20 and the second perforation 38 thereof. The second ply 16 has substantially the same length as the first ply 13, the second end 30 thereof being aligned with the second edge 29 of the first ply 13. The insert ply 15 and the second ply 16 also have perforations 30, 31, and the third ply 23 is connected by paste lines 32 and 27 to the bottom (in the outgoing configuration) face of the second ply 16, over reply address 24. A perforation line 33 is provided immediately adjacent the paste (adhesive) line 32. Provided on the second ply 16 is a sealing agent 34, which may take the form of a strip of rewettable glue (as illustrated in FIG. 1), or a piece of tape covered by a release sheet (e.g. transfer tape, as illustrated in FIG. 4 and as hereinafter described).

In the use of the embodiment of FIG. 1, after the outgoing address is imprinted onto the fly sheet 11, being transferred by the transfer means 12 as address 14 on the first (top) ply 13, the fly sheet 11 is discarded or kept as a record copy. Then the mailer 10 is mailed. Once it is received by the outgoing addressee, he/she detaches the components at the perforations 28, 30, 31 and 33, and the insert or inserts 15 is/are removed. When it is desired to use the mailer 10 for a reply, the fold over portion 16' of ply 16 is folded/pivoted over about perf line 35, covering the area left (as viewed in FIG. 1) of perf line 28 on ply 13. The rewettable glue or tape 34 is activated so that the adhesive will stick onto the face of ply 13 sealing the reply envelope (FIG. 2) thereof. In this reply configuration illustrated in FIGS. 2 and 3, the reply address 24 is readily visible on the mailer 10 and the outgoing address is no longer visible, either having been removed with that portion of the first ply 13 between the parts 20 and 28, or if any remains, being covered up by ply portion 16.

Figure 3:
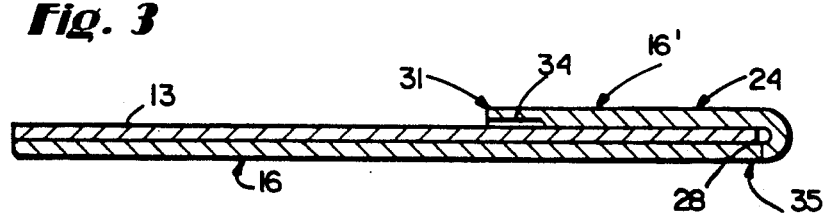
FIG. 3 is a side cross-sectional view of the mailer of FIG. 2 in the reply configuration.

The FIG. 4 construction of return mailer 110 is the same as the FIG. 1 through 3 constructions with two variations. In the embodiment of FIG. 4 the same reference numerals are used to describe the comparable components as for the FIGS. 1 through 3 embodiment, only they are preceded by a "1". Also the fly sheet (11) is not illustrated in FIG. 4.

The only two differences between the FIG. 4 and FIGS. 1 through 3 embodiment is that in FIG. 4 the sealing agent 134 has a piece of tape 39 with release covering 40 thereon, and the third ply 123 is of substantially the same length as the first and second plies 113, 116.

The recipient of mailer 110 opens the mailer 110 by breaking the perforations 128, 130, 131 and 133. Then he or she takes out in part 115, which will break loose at perf 143. When it is desired to use the mailer 110 for a return mailer, the recipient peels off ply 123 from plies 113 and 116, and ply 123 is torn away from paste line 132. (Due to postage regulations ply 123 may or may not be pasted top, bottom and left). When ply 123 is removed, it exposes the reply address 124 on the back of part 116. The recipient removes the release liner 40 and folds ply 116 about perf line 135 so that portion 116 thereof is over the top of ply 113. The outgoing address is either torn away with ply 128, or is covered up by part 116.

In both the FIG. 1 and FIG. 4 embodiments, the insert ply 15, 115 need not be pasted at the right end (as illustrated), but rather paste 25, 125 can be removed and the insert 15, 115 terminate short of a combination paste line which is a combination of paste lines 25, 26 and 125, 126 and holds the plies 13, 16 and 113, 116, together. The last part of the return that has glue or tape on it also can be short.

In the FIG. 5 embodiment, the mailer 40 has a fly sheet 41 with image transfer means 42, a first ply 43, one or more insert plies 44, a second ply 45, and a third ply 46. The outgoing address 47 (see FIGS. 5 and 6) is printed on the first ply 43 between the perforation 48 and the adhesive strip 49 which typically connects the third ply 46 to the first ply 43, the third ply 46 having a length of roughly about half that of the first ply 43. A score line 50 is formed on the third ply 46 adjacent the adhesive strip 49 to also facilitate pivotal action, and a perforation line 51 is provided adjacent the second edge 52 of the third ply 46.

The first ply 43 also has a perforation line 53 parallel to the perforation line 48, and spaced from it a distance greater than the width of the sealing agent (e.g. rewettable glue strip) 54 which is formed on the inner face of the second ply 45.

In use of the return mailer 40 of FIG. 5, after printing the fly sheet 41 is removed, and then it is mailed, with the outgoing address 47 readily visible. Once the outgoing addressee receives the form 40, he/she removes the right portion (as viewed in FIGS. 5 and 6) thereof at the perforations 53, and 56 and paste line or spot 59. This exposes the sealing agent 54 and insert poly (plies) 44 (see FIG. 6). Then to change the configuration of the form 40 to the reply configuration, the addressee detaches the third ply 46 at the perforations 51, 60, 61, 62 and folds it about the score line 50 from the position illustrated in FIG. 6 to the position illustrated in FIG. 7. In this configuration, the third ply 46 covers the sealing agent 54, which has been activated (e.g. wet) so that the third ply 46 sticks to it. On what had previously been the inner face of the third ply 46, and is now the outer face (see FIG. 7), the reply address 58 is printed. Thus only the reply address is visible in the completed reply configuration of FIG. 7.

The embodiment of FIGS. 8 and 9 is similar to that of FIGS. 5 through 7 except for the particular configuration of the sealing agent. Like structures illustrated in the FIGS. 8 and 9 embodiment are shown by the same reference numeral as in the FIGS. 5 through 7 embodiment only preceded by a "1".

In this embodiment, the sealing agent is shown in general by reference numeral 154 in FIG. 8, but is more visible in this embodiment in FIG. 9. A score line 60 is formed in the second ply 145 adjacent the sealing agent 154. In this embodiment also, the third ply 146 is slightly shorter between the score line 150 and the perforation 151 than in the FIG. 5 embodiment. Once the third ply 146 has been pivoted about score line 150 to a position in which the reply address 158 is visible, then the second ply 145 is pivoted about the score line 160 so that the sealing agent (e.g. rewettable adhesive) 154 comes into contact with the third ply 158, sealing the reply configuration of the mailer.

It will thus be seen that according to the present invention a return mailer has been provided on which only the outgoing or the reply address, not both, is visible at any one time. The mailer is relatively easy to construct, and easy to use by the outgoing addressee. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to cover all equivalent structures and products.

What is claimed is:

1. A return mailer comprising:
a top ply having first and second side edges, a first perforation adjacent said first side edge, and an intermediate perforation;
outgoing address indicia printed on said top ply substantially between said first perforation and said intermediate perforation;
a second ply having first and second side edges, and a first perforation adjacent said first side edge, and a pivot line between said first perforation and said second edge; said second ply of approximately the same dimensions as said to ply and having first and second faces, said first face closest to said top ply; said second ply having a sealing agent disposed on said first face adjacent said first perforation;
a reply address printed on said second ply second face between said first perforation and said pivot line; and
a third ply connected adjacent first and second side edges thereof to the second face of said second ply, and removably covering said reply address.

2. A mailer as recited in claim 1 wherein said sealing agent comprises tape covered by a release sheet, or rewettable glue.

3. A mailer as recited in claim 1 wherein said third ply is shorter tan said first and second plies.

4. A mailer as recited in claim 1 wherein said third ply has about the same length as said first and second plies.

5. A mailer as recited in claim 1 wherein said third play has at least one perf line therein to allow ready detachment thereof to uncover said reply address.

* * * * *